INVENTORS
John Berkman Cannon, Jr.
& Warner Ayres Eliot
BY Brady, O'Boyle & Gates
ATTORNEYS INVENTORS
John Berkman Cannon, Jr.
& Warner Ayres Eliot
BY Brady, O'Boyle & Gates
ATTORNEYS United States Patent Office 3,454,786
Patented July 8, 1969

3,454,786
NONLINEAR FUNCTION GENERATOR

John Berkman Cannon, Jr., and Warner Ayres Eliot, State College, Pa., assignors to HRB-Singer, Inc., State College, Pa., a corporation of Delaware Filed Aug. 17, 1966, Ser. No. 572,965
Int. Cl. G06g 7/22
U.S. Cl. 307—229 10 Claims This invention relates to means for generating nonlinear waveforms and more particularly to a nonlinear function generator which provides an output waveform of a predetermined function whose slope varies over a relatively large range.

The use of nonlinear voltage-current characteristics of semiconductor diodes for generating nonlinear waveforms is well known to those skilled in the art; however, the usual concept is to use diode networks as attenuators. For example, if a repetitive logarithmic waveform is desired, it would be generated by passing a repetitive linear sawtooth voltage waveform through a logarithmic attenuating network or through an amplifier that uses such an attenuating network in its feedback loop.

When it is desired to generate a repetitive function of the form $e=K \tan Wt$ over the interval of $Wt=35°$ to slightly greater than $Wt=89°$, an inherent limitation exists when prior art apparatus is utilized due to the fact that over the interval from 35° to 89°, the slope of the tangent function varies over a range of approximately 1800 to 1. The slope of the input must be as great as the steepest part of the desired output wave when utilizing a passive attenuating network; therefore, the attenuation of the network must be extremely large. The minimum amplitude of the output wave, moreover, is limited by the available diode characteristics in addition to the extent to which the diodes can be suitably temperature compensated. Because of this fact, the input waveform necessarily requires the use of an objectionably large amplitude waveform.

It is an object of the present invention, therefore, to provide an improved nonlinear function generator which obviates the need for large voltage swings to generate the desired output waveform.

It is still another object of the present invention to provide a waveform generator which is capable of generating a function such as the tangent function over the interval from 35° to 89°, during which interval the slope of the desired function covers a range of approximately 1800 to 1.

It is yet another object of the present invention to provide an improved nonlinear function generator utilizing semiconductor components.

Other objects and advantages of the invention will become apparent during the course of the following detailed description.

Figure 1A:
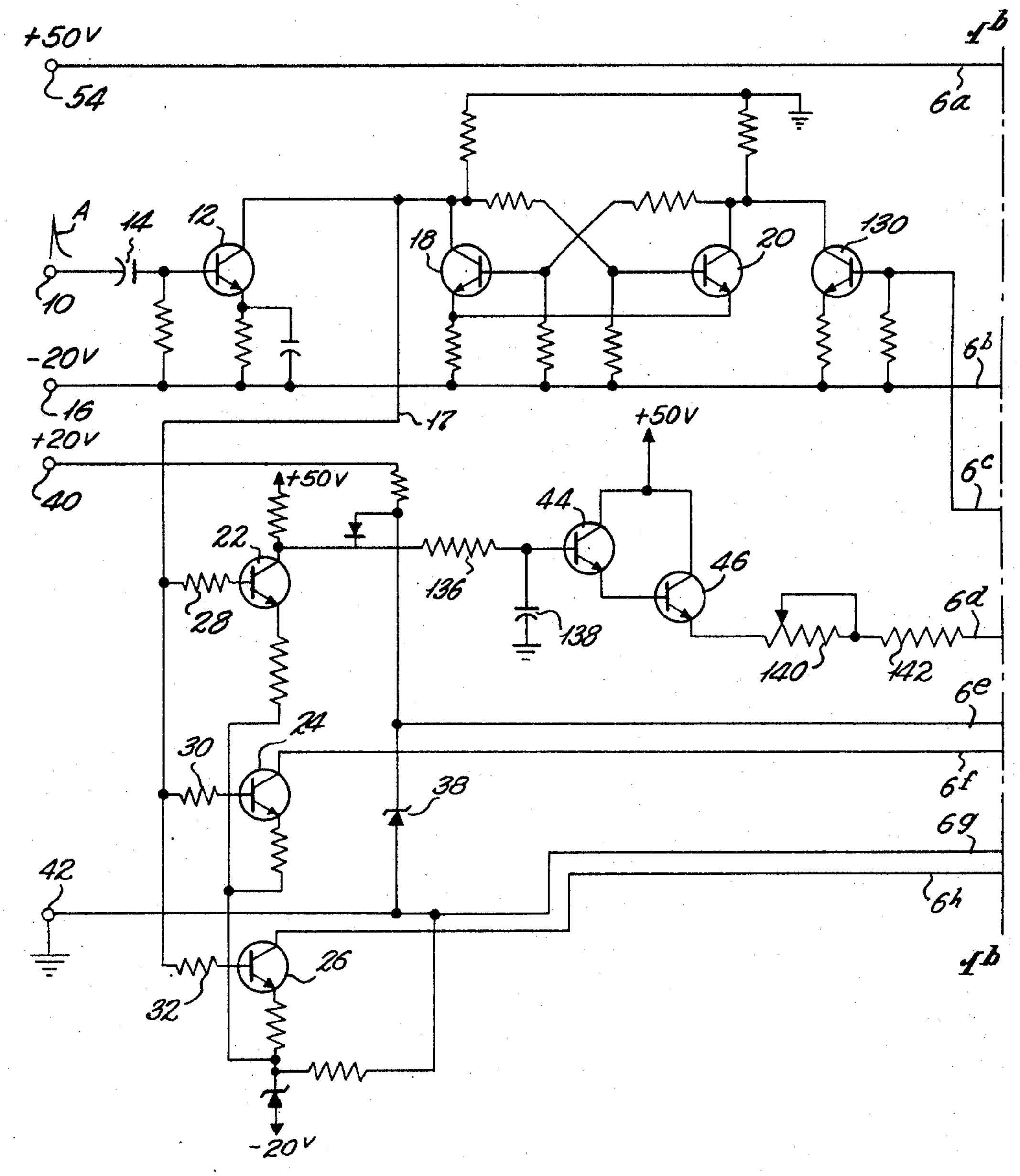
Figures 1B, 2, 3:
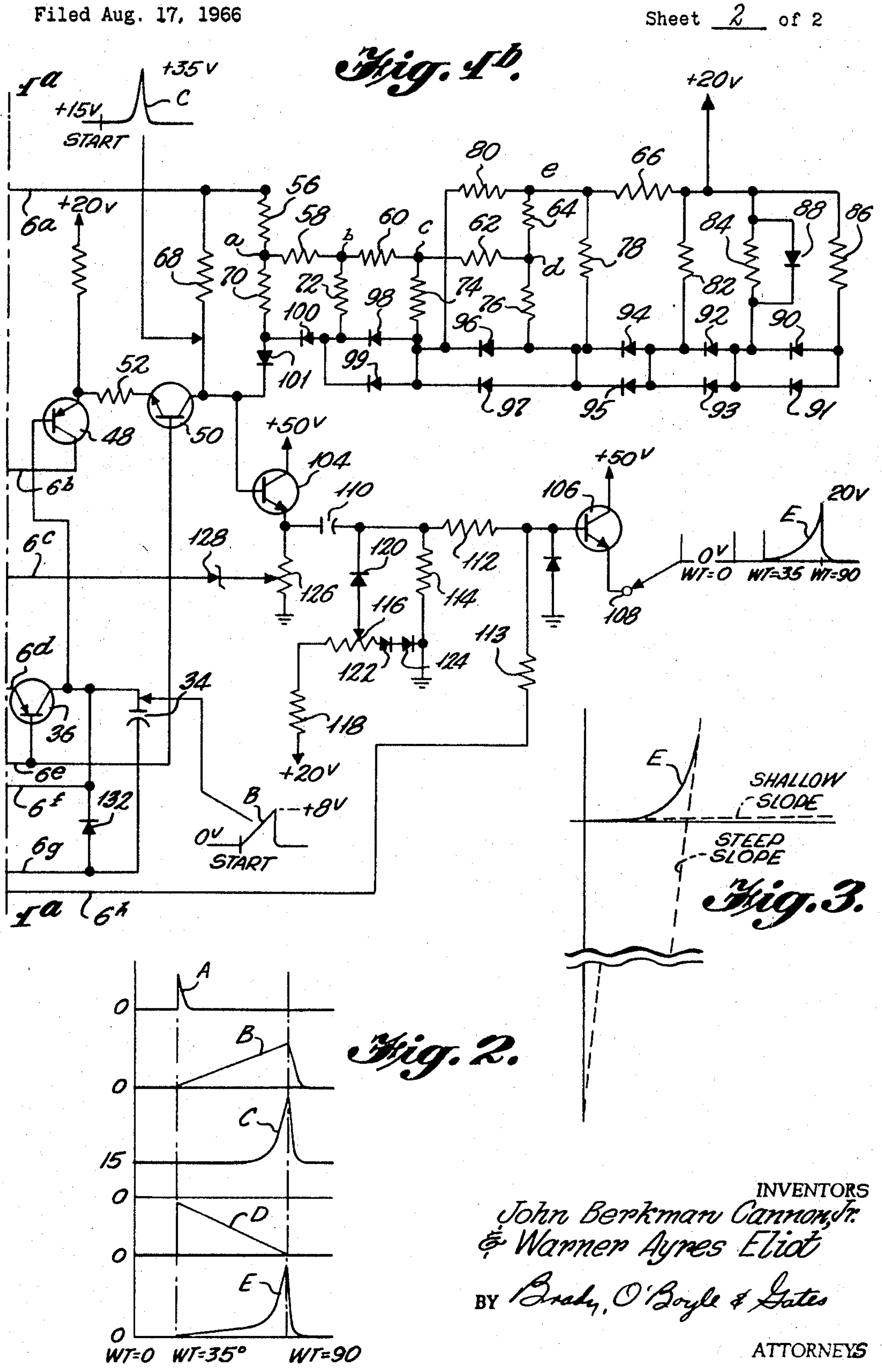

In the accompanying drawings forming a part of this application and in which like numerals are employed to designate like parts throughout the same, FIGURES 1*a* and 1*b* illustrate a composite schematic electrical diagram of the preferred embodiment of the subject invention;

FIGURE 2 is a series of illustrative waveforms present at selected points of the preferred embodiment; and FIGURE 3 is a diagram helpful in understanding the invention.

Briefly, the subject invention contemplates the use of a sawtooth current source, as opposed to a voltage source, to drive a nonlinear network including a plurality of semiconductor diodes in order to obviate the heretofore required relatively large voltage swings, and to utilize the nonlinear voltage-current characteristic of some of the plurality of diodes to form the shallow sloped portion of the desired function waveform with a smooth transition to the remainder of the plurality of diodes which are utilized as simple switches selectively shorting additional load resistors to form the steeper sloped portion of the desired waveform. FIGURE 3 illustrates this change in slope.

Referring to the drawings, FIGURES 1*a* and 1*b* discloses an embodiment of the subject invention which is adapted to generate the tangent function according to the equation:

$$e=K \tan Wt$$

Moreover, the present embodiment shown in FIGURE 1 is adapted to generate the tangent function between the interval from 35° to approximately 90° where the slope of the desired function covers a range of approximately 1800 to 1 such as shown in FIGURE 3. It should be borne in mind, however, that the present invention illustrates the generation of a waveform corresponding to the tangent function by way of example only and it is not meant to be considered in a limiting sense, since the inventive concept hereinafter disclosed is well suited to any desired waveform whose slope changes over a considerably wide range.

Considering FIGURES 1*a* and 1*b* in detail, an input terminal 10 is included which is adapted to receive a trigger signal A at a selected time to designate the start of an interval corresponding to an angle of 35°. Such a trigger is also illustrated as curve A of FIGURE 2. The trigger signal is coupled to a trigger amplifier 12 comprising a NPN transistor which has its base coupled to the input terminal 10 by means of a capacitor 14. A negative power supply voltage (−20 v.) from a source, not shown, is adapted to be coupled to the emitter of amplifier 12 by means of terminal 16. Coupled to the collector of trigger amplifier 12 is a bistable multivibrator circuit comprising transistors 18 and 20. The trigger amplifier 12 and transistor 18 of the bistable multivibrator circuit are also coupled to the three transistors 22, 24 and 26 by means of circuit lead 17.

When the input trigger is received at input terminal 10, the bistable multivibrator is driven into a first operating state wherein transistor 18 is rendered conductive. In this state, the collector voltage of transistor 18 is sufficiently negative due to the fact that transistors 18 and 20 are also powered from the negative supply source (−20 v.) applied to terminal 16. Transistors 22, 24 and 26 are cut off thereby inasmuch as the collector voltage is coupled to their respective bases by means of resistors 28, 30 and 32. Considering momentarily transistor 24, its collector is directly connected to one side of capacitor 34 shown in FIGURE 1*b* by means of *6f*. Also, connected at this same junction, is the collector of transistor 36 which is shown as a PNP transistor connected in a common base configuration. The base of transistor 36 is coupled to one side of Zener diode 38 by means of circuit lead *6e* which is adapted to provide a +9 volt reference level due to its coupling across a DC voltage (+20 v.) from a source not shown applied to terminal 40 and a point of reference potential hereinafter referred to as "ground" established at terminal 42. The emitter of transistor 36 is coupled back to transistor 22 through the emitter follower circuit comprising transistors 44 and 46 by means of lead 6*d*. The emitter of transistor 36 is supplied by a steady DC current by this circuit in a manner to be described subsequently.

It should be pointed out that it is well known to those skilled in the art that a common base transistor amplifier exhibits a low input impedance but a high output impedance. It is also well known to those skilled in the art that a source having a high source or output impedance acts as a current source as opposed to a voltage source which exhibits a low source impedance. Since the transistor amplifier 36 has a steady or a constant current input, the output collector current will be a constant value also. This collector current from transistor 36 is used to charge the capacitor 34. When a capacitor is charged by a constant current *i*, the voltage $E_c$ appearing thereacross will rise linearly, as shown in curve B of FIGURE 2, since $$E_o=\frac{1}{C}\int_0^t i\,dt \qquad (1)$$

and if the current *i* equals a constant $I_o$, then $$E_o=\frac{I_o}{C}\,t \qquad (2)$$

When transistor 24 is conducting, the capacitor 34 is prevented from charging; however, when transistor 24 is cut off or rendered non-conductive by means of transistor 18 switching to the first operating state of the multivibrator, its collector draws no current and the voltage across capacitor 34 is permitted to rise linearly in a manner determined by the size of the capacitor and the collector current of transistor 36. Since transistor 36 is used in a common base configuration, its collector current is nearly independent of collector voltage over a fairly wide range so that it serves as a constant current source $I_o$ to develop the linear sawtooth voltage waveform across capacitor 34 according to Equation 2.

Coupled to the common connection between the collector of transistor 36 and the capacitor 34 is the base of an emitter follower circuit comprised of transistor 48. Coupled to the emitter of transistor 48 is another common base transistor amplifier comprising transistor 50 having its emitter connected to the emitter of transistor 48 by means of resistor 52.

It is at this point that the heart of the present invention is essentially embodied. The sawtooth voltage generated across the capacitor 34 is coupled to the common base amplifier comprising transistor 50 by means of the emitter follower 48 which acts simply as an impedance matching device. The collector load of transistor 50 is a nonlinear network comprised of a plurality of load resistors 68–86 and semiconductor diodes 88–101 connected together to the collector as follows: a positive DC supply voltage 50 v. is adapted to be coupled to terminal 54 from a source not shown while the +20 v. positive DC supply voltage connected to terminal 40 is applied across a voltage divider network comprised of resistors 56, 58, 60, 62, 64 and 66. With the voltages thus applied, the voltage divider will provide the following voltages when not loaded: 30 volts at point *a*, 25 volts at point *b*, 23 volts at point *c*, 21.4 volts at point *d*, and 20.5 volts at point *e*. The plurality of load resistors are connected to the voltage divider network in the following manner. Resistor 68 is coupled to the resistor 56 at the junction to terminal 54. Resistor 70 is connected to point *a* which is common to resistors 56 and 58. Likewise, resistors 72, 74, 76 and 78 are connected to points *b, c, d,* and *e,* respectively. Another resistor 80 is also connected to point *e*. Resistors 82, 84 and 86 are commonly connected to resistor 66 which is common to the +20 v. voltage applied at terminal 40. The load resistors 68, 70, 72 . . . 86 are selected such that the values of the resistances are arranged in a descending order such that resistor 68 has the highest value of resistance whereas resistor 86 has the lowest value of resistance. The load resistors may have the following typical values:

| | |
|---|---|
| R68 | 100K* |
| R70 | 33K |
| R72 | 15K |
| R74 | 10K |
| R76 | 4.7K |
| R78 | 4.7K |
| R80 | 22K |
| R82 | 1.5K |
| R84 ohms | 470 |
| R86 do | 150 |

*K=1000 ohms.

The plurality of semiconductor diodes 88–101 are coupled to the load resistors 68–86 in two groups. The first group of diodes comprises diodes 88–93. Diode 88 is coupled directly across resistor 84 whereas diodes 90 and 91 are coupled together in parallel between resistors 84 and 86. Diodes 92 and 93 are coupled in parallel between resistors 84 and 82. The second group of diodes 94–99 are coupled together in pairs between resistors 82 and 72. A single diode 100 is connected between resistors 72 and 70 and also a single diode 101 is connected between resistors 70 and 68 with the cathode of diode 101 being directly coupled to the collector of transistor 50. All of the diodes 90–101 are similarly poled with respect to each other for purposes of which will be more fully explained.

As noted above, a common base transistor amplifier exhibits a high output impedance. Transistor 50 is adapted to be operated so that its collector current is nearly equal to its emitter current over the range of collector voltages of interest. This provides a sawtooth current source for the nonlinear collector load network, previously described. Since the sawtooth voltage waveform developed across capacitor 34 as shown, curve B of FIGURE 2 is applied to the emitter of transistor 50. When the base is biased at 9 volts by means of the connection to Zener diode 38, a decreasing sawtooth current waveform is developed at the collector of transistor 50 which starts at its maximum value and diminishes linearly as shown in curve D of FIGURE 2.

At the start of the time interval wherein $Wt=35°$ and the trigger is applied to the input terminal 10, the collector current of transistor 50 is at a maximum. All of the diodes 88–101 are also in a conductive state due to bias applied means of the voltage divider. The majority of the collector current, moreover, flows through the lowest impedance path which consists of all of the diodes 101 through diode 88 in addition to resistors 84 and 86 directly connected to the +20 v. DC voltage applied to terminal 40.

When all of the semiconductor diodes 101–88 are conducting, the effective resistance of the load network is small, and therefore the slope of the output voltage waveform (curve C of FIGURE 2) at the collector of transistor 50 will be very shallow. Also, with the voltages as noted, the collector voltage at the beginning of the cycle will be approximately +15 volts.

As the collector current through the network begins to decrease linearly (curve D of FIGURE 2), the diode resistances increase, causing the slope of the output wave (curve C) to increase as the output voltage increases. When the current through resistor 84 decreases to the point where its IR drop is approximately 0.6 volt, diodes 88, 90 and 91 cease to conduct. In like manner, diodes 92 and 93 will cease conducting when the current through R82 becomes too small to sustain a drop of about 0.6 volt across it. Thus, the effective resistance of the network continues to increase causing the slope of the output voltage to do likewise. Up to this point, the shape of the output voltage wave is determined primarily by the curved voltage-current characteristic of the diodes 88–93. This continues to be a factor in the remaining steps of the waveform, but since these voltage steps begin to be progressively more widely separated, the diode characteristics contribute proportionately less than the fact that shunting resistors are being sequentially disconnected by the switching action of the diodes 94 through 101. For example, by the time the output voltage reaches +24 volts (the voltage at point *b*), only diodes 100 and 101 are conducting, thus the resistance of the network consists essentially of resistors 68, 70 and 72 in parallel. As the output voltage passes +25 volts, diode 100 ceases to conduct. Above +30 volts, no diodes are conducting and the network consists of resistance 68 alone. Thus, the highest part of the output wave is a straight line segment having a slope many hundreds of times greater than the starting slope.

An output circuit is coupled to the collector transistor 50 for translating the voltage waveform, curve C of FIGURE 2, appearing at the collector to an output terminal. This comprises transistors 104 and 106 which act as emitter followers such that the emitter of transistor 106 is directly connected to an output terminal 108. AC coupling and DC restoration is used between transistors 104 and 106 to reference the DC level of the output wave as shown in curve E of FIGURE 2 to ground potential. This circuitry includes capacitor 110 and the diode-resistor network comprising resistors 112, 114, 116, 118 and diodes 120, 122 and 124.

When a desired waveform has reached a selected maximum value corresponding to $Wt \approx 90°$, it is desirable that the bistable multivibrator comprised of transistors 18 and 20 be reset to its initial condition. This is achieved by means of potentiometer 126 coupled to the emitter of transistor 104. The slider of potentiometer 126 is connected to a Zener diode 128 which is then coupled to the base of transistor 130 by means of circuit lead 6c.

When the waveform at the collector of transistor 50 reaches the desired maximum value, determined by the setting of potentiometer 126 (typically +35 volts), Zener diode 128 conducts rendering transistor 130 conductive. This drives the bistable multivibrator comprising transistors 18 and 20 into a second operating state wherein transistor 20 is conducting. In this second operating state, the collector voltage of transistor 18 is sufficiently positive to cause transistors 22, 24, 26 to conduct.

The conduction of transistor 24 causes the voltage across capacitor 34 to be clamped back to zero voltage level. Diode 132 coupled across the capacitor 34 prevents this voltage from going below this zero reference level. This action also returns the output voltage to an initial starting point. When the output voltage reaches its most negative value, diode 120 conducts to establish a charge on capacitor 110 at a value determined by the setting of potentiometer 126. This is set so that the DC level of the signal at the output terminal 108 starts at the correct value. Diodes 122 and 124 are for the purposes of temperature compensation.

The transistor 26 acts to establish a zero reference pedestal in the output signal during the dead time interval between the end of one output wave and the start of the next. The collector current of transistor 26 causes a sufficient drop in resistor 112 that transistor 106 is cut off during the dead time and the output voltage at the emitter of transistor 106 under the influence of an external load, not shown, goes to zero.

The circuit comprising transistors 22, 44 and 46 is intended to compensate for slight long term drifting of the repetition rate of the incoming trigger pulses applied to input terminal 10 and tends, through feedback, to maintain a fixed duty cycle in the presence of such drifting. Transistor 22 is turned on and off by the action of the bistable multivibrator comprising transistors 18 and 20. During the period following an input trigger, when an output wave is being generated, transistor 22 is cut off and its collector voltage rises to the value of the DC supply voltage (+50 v.) applied thereto. During the dead time, transistor 22 conducts and its collector voltage drops to a value, for example, +9 volts. The rectangular wave thus formed is integrated by resistor 136 and capacitor 138 to form a DC voltage between the limits of the supply voltage (+50 v.) and the voltage of the collector during conduction, depending upon the duty cycle. This voltage is translated through the cascade emitter followers 44 and 46 and the resistors 140 and 142 to the emitter of transistor 36 to control the charging current of capacitor 34, thus controlling the duty cycle.

Thus what has been described is a nonlinear waveform generator which is capable of generating a waveform whose slope varies over an extremely wide range while obviating the necessity for large voltage swings to achieve a wide range of operation. The invention is directed primarily to the utilization of a current source and a network of diodes and resistors arranged so that some the diodes contribute most to the desired waveform by virtue of their forward voltage-current characteristics while the others contribute mostly by switching in or out parallel resistances in the network. It should also be borne in mind that the foregoing description has been made by way of illustration and is not meant to be interpreted in a limited sense. For example, it is not essential to the concept of the invention that the output signal be a fixed function of time, e.g. $e = \tan Wt$; it could be used simply as a means of generating any desired type of waveform in response to a starting signal.

While there has been shown and described what is considered at present to be the preferred embodiment of the invention, modifications thereto will readily occur to those skilled in the art. It is not desired, therefore, that the invention be limited to those specific arrangements shown and described but it is to be understood that all equivalents, alterations, and modifications within the spirit and scope of the invention herein are meant to be included.

We claim as our invention:

1. A nonlinear function generator providing an output signal of a predetermined waveform whose slope varies over a relatively large range while obviating the need for large voltage swings comprising in combination: an input circuit including an input terminal adapted to receive a trigger signal at a selected time to designate start of an interval;

a current driving source coupled to said input circuit, generating a substantially linear sawtooth current waveform in response to said trigger signal;

a nonlinear network including a plurality of resistors and diode means having nonlinear voltage-current characteristics coupled together to said current driving source forming a load circuit thereby and being responsive to said sawtooth current waveform to generate said output waveform, said plurality of diode means comprising a first group of diodes being responsive to said sawtooth current waveform to generate a first portion of said output signal corresponding to the shallow portion thereof by utilizing the nonlinear voltage current characteristics of said diodes, and a second group of diodes being responsive to said sawtooth current waveform to generate a second portion of said output signal corresponding to the steep portion thereof by selectively shorting out one or more of said plurality of resistors;

and an output circuit including an output terminal coupled to said nonlinear network providing access to said output signal.

2. The invention as defined by claim 1, wherein said current driving source comprises: a first common base transistor amplifier circuit adapted to operated as a constant current source and providing a substantially constant collector current, capacitor means coupled to said first common base transistor circuit, being charged by the substantially constant collector current for generating a substantially linear sawtooth voltage waveform thereacross, a second common base transistor amplifier including means for coupling said sawtooth voltage waveform to the emitter circuit thereof, and circuit means for coupling said nonlinear network to the collector circuit of said second common base transistor amplifier, the collector current of said second common base amplifier being a substantially linear sawtooth current waveform for operating said nonlinear network.

3. Apparatus as defined by claim 1, wherein said current driving source comprises: means for generating a substantially linear voltage waveform; amplifier means, having a relatively low input impedance and a relatively high output impedance, coupled to said means for generating said substantially linear voltage waveform, said amplifier means being responsive to said voltage waveform to produce a current waveform which is substantially linear, and wherein a selected number of said plurality of resistors of said nonlinear network comprises load resistors coupled to said amplifier means; a first and a second supply voltage; a voltage divider network coupled across said first and a second supply voltage; means coupling said load resistors to said voltage divider network; and means for coupling said first and second group of diodes between load resistors and being poled to be responsive to said current waveform to become selectively nonconductive as the current waveform decreases.

4. The nonlinear function generator as defined by claim 1, and additionally including a first and a second supply voltage, and wherein said plurality of resistors of said nonlinear network comprises a voltage divider circuit connected between said first and said second supply voltage and a plurality of load resistors coupled together by means of said voltage divider circuit and said first and said second group of diodes, with at least one diode of said first group of diodes being connected in parallel with one of said load resistors.

5. The nonlinear function generator as defined by claim 1, including a first and a second supply voltage and wherein said plurality of resistors of said nonlinear network comprises a voltage divider network coupled between said first and said second supply voltage providing a plurality of voltage points thereby and a plurality of load resistors respectively connected to said voltage points, circuit means for connecting said first and said second group of diodes to said plurality of load resistors, said second group of diodes being biased by said voltage divider network and effectively coupling said plurality of load resistors together in parallel and being selectively conductive to sequentially switch said load resistors in and out of circuit relationship, with at least one diode of said first group of diodes being connected in parallel across one of said load resistors.

6. The nonlinear function generator as defined by claim 5, wherein said plurality of load resistors have resistance values which are relatively decreasing in value from one to another with said at least one diode of said first group of diodes connected across a load resistance having a relatively low value.

7. The invention as defined by claim 5, wherein said first and said second group of diodes are semiconductor diodes connected in a front-to-back circuit relationship and being poled to be responsive to said amplifier means such that an increase in output voltage effects a linear decrease in current.

8. The invention as defined by claim 1, wherein said current driving source includes a transistor amplifier having an emitter, a base and a collector and being operated as a common base amplifier including means for coupling said nonlinear network to the collector of said transistor amplifier and wherein said plurality of resistors comprises a plurality of load resistors coupled together in parallel by means of said plurality of diodes; with at least one diode of said first group of diodes being connected across one of said load resistors, all of said diodes being similarly poled with respect to said collector whereby a decrease in collector current respectively renders said at least one diode of said diodes non-conductive first with a subsequent sequential turn-off of all said plurality of said diodes.

9. The nonlinear function generator as defined by claim 1, wherein said input circuit includes: a bistable circuit adapted to be triggered to a first state by means of said trigger signal, a gate circuit coupled to said bistable circuit and being rendered inoperative thereby until said bistable circuit is triggered into said first state, said gate circuit being coupled to said current driving source for initiating the generation of said sawtooth current waveform; and wherein said output circuit includes circuit means for triggering said bistable circuit to a second state when said output waveform reaches a predetermined amplitude thereby rendering said gate circuit inoperative and returning said current driving source to its initial state.

10. The apparatus as defined in claim 1, wherein said input circuit comprises: a bistable multivibrator circuit adapted to be responsive to said trigger signal to switch to a first operating state; a gating circuit coupled to said bistable multivibrator circuit and adapted to be rendered operative when said bistable multivibrator circuit assumes said first operating state; circuit means coupling said gating circuit to said current driving source comprising a constant current source coupled to a capacitor, said capacitor being charged by said constant current source to produce a substantially linear voltage waveform; and a grounded base transistor amplifier coupled to said capacitor; circuit means coupling said gating circuit to said capacitor for initiating said sawtooth voltage waveform when said multivibrator circuit assumes said first operating state; and wherein said output circuit includes circuit means responsive to the amplitude of said output waveform to trigger said bistable multivibrator circuit to a second operating state thereby rendering said gating circuit inoperative and returning the charge on said capacitor to its initial state.

References Cited

UNITED STATES PATENTS

| | | | |
|---|---|---|---|
| 2,956,157 | 10/1960 | Graham | 328—743 XR |
| 3,188,493 | 6/1965 | Malagari | 307—229 |
| 3,205,377 | 9/1965 | Nix | 307—229 XR |
| 3,213,292 | 10/1965 | Taylor | 307—257 XR |

ARTHUR GAUSS, *Primary Examiner.*

STANLEY T. KRAWCZEWICZ, *Assistant Examiner.*

U.S. Cl. X.R.

307—228, 257, 261, 263, 321; 328—36, 142